(12) United States Patent
Michaely et al.

(10) Patent No.: US 11,282,525 B2
(45) Date of Patent: Mar. 22, 2022

(54) CONTEXTUAL DENORMALIZATION FOR AUTOMATIC SPEECH RECOGNITION

(71) Applicant: Google LLC, Mountain View, CA (US)

(72) Inventors: Assaf Hurwitz Michaely, Long Island City, NY (US); Petar Aleksic, Jersey City, NJ (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/009,494

(22) Filed: Sep. 1, 2020

(65) Prior Publication Data

US 2020/0402512 A1  Dec. 24, 2020

Related U.S. Application Data

(63) Continuation of application No. 16/192,953, filed on Nov. 16, 2018, now Pat. No. 10,789,955.

(51) Int. Cl.
*G10L 15/26* (2006.01)
*G06F 40/56* (2020.01)
*G10L 15/22* (2006.01)

(52) U.S. Cl.
CPC .............. *G10L 15/26* (2013.01); *G06F 40/56* (2020.01); *G10L 15/22* (2013.01); *G10L 2015/228* (2013.01)

(58) Field of Classification Search
CPC ......... G10L 15/26; G10L 15/22; G06F 40/56; G06F 40/151

USPC ........................................................ 704/257
See application file for complete search history.

(56) References Cited

U.S. PATENT DOCUMENTS

| 9,135,231 | B1 | 9/2015 | Barra et al. |
| 9,460,088 | B1 | 10/2016 | Sak et al. |
| 10,789,955 | B2 * | 9/2020 | Michaely .............. G06F 40/151 |
| 2009/0157385 | A1 | 6/2009 | Tian |
| 2015/0269136 | A1 | 9/2015 | Alphonso et al. |
| 2017/0186432 | A1 | 6/2017 | Aleksic et al. |

OTHER PUBLICATIONS

International Search report for the related application No. PCT/US2019/049401 dated Sep. 3, 2019.

* cited by examiner

*Primary Examiner* — Susan I McFadden
(74) *Attorney, Agent, or Firm* — Honigman LLP; Brett A. Krueger; Grant Griffith

(57) ABSTRACT

A method includes receiving a speech input from a user and obtaining context metadata associated with the speech input. The method also includes generating a raw speech recognition result corresponding to the speech input and selecting a list of one or more denormalizers to apply to the generated raw speech recognition result based on the context metadata associated with the speech input. The generated raw speech recognition result includes normalized text. The method also includes denormalizing the generated raw speech recognition result into denormalized text by applying the list of the one or more denormalizers in sequence to the generated raw speech recognition result.

20 Claims, 9 Drawing Sheets

CONTEXTUAL DENORMALIZATION FOR AUTOMATIC SPEECH RECOGNITION

CROSS-REFERENCE TO RELATED APPLICATIONS

This U.S. patent application is a continuation of, and claims priority under 35 U.S.C. § 120 from, U.S. patent application Ser. No. 16/192,953, filed on Nov. 16, 2018. The disclosure of this prior application is considered part of the disclosure of this application and is hereby incorporated by reference in its entirety.

TECHNICAL FIELD

This disclosure relates to contextual denormalization for automatic speech recognition.

BACKGROUND

Automatic speech recognition (ASR) systems generate raw speech recognition results that include normalized text as a result of training these ASR systems on text that is normalized. Normalized text refers to text that is verbalized, all letters in lower case, and stripped of all punctuation. The ASR systems then incorporate a set of denormalizers for denormalizing the raw speech recognition results into a form that is more readable to a user. For instance, the set of denormalizers may convert a raw speech recognition result by verbalizing spelled out numbers (e.g., convert "one-hundred and seventy-seven" into "177"), capitalizing appropriate letters (e.g., "send a text to john" into "Send a text to John"), and adding punctuation (e.g., convert "thanks exclamation mark" to "thanks!"). As the set of denormalizers correspond to a chain of denormalizer rules, where a first denormalizer starts with the raw speech recognition result and each subsequent denormalizer receives as input the output of the previous denormalizer, there is no single sequence of denormalization rules that is optimal for all ASR output use cases because what is optimal depends in part on the state and preferences of the user. As a result, ASR systems generally rely on different ASR modules for transcribing speech depending upon the application at hand. For instance, one ASR module may be used when a user is dictating speech and a separate ASR module may be used when the user is performing a voice search. The use of multiple ASR modules still does not address custom denormalization for each user and also adds to increased cost and latency for having to maintain and access multiple ASR modules for outputting speech recognition results.

SUMMARY

One aspect of the disclosure provides a method for denormalizing raw speech recognition results. The method includes receiving, at data processing hardware of an automated speech recognition (ASR) module, a speech input from a user. The ASR module includes a predefined set of denormalizers to apply for denormalizing normalized text generated by the ASR module. The method also includes obtaining, by the data processing hardware, context metadata associated with the speech input and generating, by the data processing hardware, a raw speech recognition result corresponding to the speech input. The generated raw speech recognition result including normalized text. The method also includes selecting, by the data processing hardware, a list of one or more denormalizers to apply to the generated raw speech recognition result based on the context metadata associated with the speech input and denormalizing, by the data processing hardware, the generated raw speech recognition result into denormalized text by applying the list of the one or more denormalizers in sequence to the generated raw speech recognition result.

Implementations of the disclosure may include one or more of the following optional features. In some implementations, receiving the speech input includes receiving audio data corresponding to the speech input from a user device associated with the user and obtaining the context metadata associated with the speech input includes receiving the context metadata associated with the speech input from the user device when the audio data for the speech input is received. In some examples, obtaining the context metadata associated with the speech input includes receiving a user identifier associated with the user when the speech input is received and retrieving the context metadata from memory hardware in communication with the data processing hardware using the user identifier. The context metadata may include at least one of a speech recognition category associated with the speech input, an application running on the user device associated with the user, a location of the user at the time the speech input was received, the user identifier identifying the user, demographic information associated with the user, or user preferences for denormalizing text. In some implementations, selecting the list of the one or more denormalizers includes modifying a default list of denormalizers from the predefined set of denormalizers by at least one of removing one or more denormalizers from the default list of denormalizers or adding one or more denormalizers from the predefined set of denormalizers to the default list of denormalizers.

In some implementations, the method further includes, providing, by the data processing hardware, the context metadata associated with the speech input to a context server and receiving, at the data processing hardware, denormalization instructions from the context server, the context server configured to generate the denormalization instructions for denormalizing the generated raw speech recognition result into the denormalized text based on the context metadata. In these implementations, selecting the list of the one or more denormalizers includes selecting the list of the one or more denormalizers using the denormalization instructions received from the context server. In some examples, providing the context metadata associated with the speech input to the context server includes providing the context metadata associated with the speech input to the context server without providing the speech input or any audio data associated with the speech input to the context server.

In some examples, the denormalization instructions include one or more of the following instructions including, a prepend demoralizer instruction identifying a new denormalizer to prepend at a beginning of a default list of denormalizers, the default list of denormalizers including a portion of the predefined set of denormalizers to apply to the generated raw speech recognition result in sequence in the absence of the context data, an append denormalizer instruction identifying a new denormalizer to append at the end of the default list of denormalizers; a remove denormalizer instruction identifying an existing denormalizer to be removed from the default list of denormalizers; a substitute denormalizer instruction identifying a new denormalizer to replace an existing denormalizer from the default list of denormalizers; or an add denormalizer instruction identifying a new denormalizer to add to the default list of denormalizers and identifying an existing denormalizer from the default list of denormalizers that precedes or follows the new denormalizer. Alternatively, the denormalization instructions may include an override instruction that overrides the default list of denormalizers with a new list of denormalizers. The new list of denormalizers may include the selected list of the one or more denormalizers. In some implementations, the context server is configured to receive one or more custom denormalization rules specific to a client of the ASR module, and compile a custom denormalizer based on the one or more custom denormalization rules specific to the client.

In some implementations, denormalizing the generated raw speech recognition result into the denormalized text using the selected list of the one or more denormalizers includes retrieving each denormalizer of the selected list of the one or more denormalizers from memory hardware using a corresponding key and applying each denormalizer of the selected list of the one or more denormalizers retrieved from the memory hardware in sequence to the generated raw speech recognition result. The memory hardware is in communication with the data processing hardware. In some examples, the memory hardware resides on the ASR module. In other examples, the memory hardware includes a repository remotely located from the ASR module.

In some examples, the method further includes, after denormalizing the generated raw speech recognition result into the denormalized text, transmitting the denormalized text from the ASR module to a client device. In these examples, the denormalized text, when received by the client device, is configured to cause the client device to display the denormalized text on a display screen of the client device. In some implementations, transmitting the denormalized text from the ASR module includes streaming the denormalized text to the client device in real-time.

Another aspect of the disclosure provides a system for denormalizing raw speech recognition results. The system includes data processing hardware of an automated speech recognition (ASR) module and memory hardware of the ASR module in communication with the data processing hardware. The ASR module includes a predefined set of denormalizers to apply for denormalizing normalized text generated by the ASR module. The memory hardware stores instructions that when executed by the data processing hardware cause the data processing hardware to perform operations that include receiving a speech input from a user, obtaining context metadata associated with the speech input, and generating a raw speech recognition result corresponding to the speech input. The generated raw speech recognition result includes normalized text. The operations further include selecting a list of one or more denormalizers to apply to the generated raw speech recognition result based on the context metadata associated with the speech input and denormalizing the generated raw speech recognition result into denormalized text by applying the list of the one or more denormalizers in sequence to the generated raw speech recognition result.

Implementations of the disclosure may include one or more of the following optional features. In some implementations, receiving the speech input includes receiving audio data corresponding to the speech input from a user device associated with the user and obtaining the context metadata associated with the speech input includes receiving the context metadata associated with the speech input from the user device when the audio data for the speech input is received. In some examples, obtaining the context metadata associated with the speech input includes receiving a user identifier associated with the user when the speech input is received and retrieving the context metadata from the memory hardware using the user identifier. The context metadata may include at least one of a speech recognition category associated with the speech input, an application running on the user device associated with the user, a location of the user at the time the speech input was received, the user identifier identifying the user, demographic information associated with the user, or user preferences for denormalizing text. In some implementations, selecting the list of the one or more denormalizers includes modifying a default list of denormalizers from the predefined set of denormalizers by at least one of removing one or more denormalizers from the default list of denormalizers or adding one or more denormalizers from the predefined set of denormalizers to the default list of denormalizers.

In some implementations, the operations further include providing context metadata associated with the speech input to a context server and receiving denormalization instructions from the context server, the context server configured to generate the denormalization instructions for denormalizing the generated raw speech recognition result into the denormalized text based on the context metadata. In these implementations, selecting the list of the one or more denormalizers includes selecting the list of the one or more denormalizers using the denormalization instructions received from the context server. In some examples, providing the context metadata associated with the speech input to the context server includes providing the context metadata associated with the speech input to the context server without providing the speech input or any audio data associated with the speech input to the context server.

In some examples, the denormalization instructions include one or more of the following instructions including: a prepend denormalizer instruction identifying a new denormalizer to prepend at a beginning of a default list of denormalizers, the default list of denormalizers including a portion of the predefined set of denormalizers to apply to the generated raw speech recognition result in sequence in the absence of the context data; an append denormalizer instruction identifying a new denormalizer to append at the end of the default list of denormalizers; a remove denormalizer instruction identifying an existing denormalizer to be removed from the default list of denormalizers; a substitute denormalizer instruction identifying a new denormalizer to replace an existing denormalizer from the default list of denormalizers, or an add denormalizer instruction identifying a new denormalizer to add to the default list of denormalizers and identifying an existing denormalizer from the default list of denormalizers that precedes or follows the new denormalizer. Additionally or alternatively, the denormalization instructions may include an override instruction that overrides the default list of denormalizers with a new list of denormalizers. The new list of denormalizers may include the selected list of the one or more denormalizers. In some implementations, the context server is configured to receive one or more custom denormalization rules specific to a client of the ASR module, and compile a custom denormalizer based on the one or more custom denormalization rules specific to the client.

In some examples, denormalizing the generated raw speech recognition result into the denormalized text using the selected list of the one or more denormalizers includes retrieving each denormalizer of the selected list of the one or more denormalizers from the memory hardware using a corresponding key and applying each denormalizer of the selected list of the one or more denormalizers retrieved from the memory hardware in sequence to the generated raw speech recognition result. In some examples, the memory hardware resides on the ASR module. In other examples, the memory hardware includes a repository remotely located from the ASR module.

In some implementations, the operations further include, after denormalizing the generated raw speech recognition result into the denormalized text, transmitting the denormalized text from the ASR module to a client device. In these implementations, the denormalized text, when received by the client device, is configured to cause the client device to display the denormalized text on a display screen of the client device. In some examples, transmitting the denormalized text from the ASR module includes streaming the denormalized text to the client device in real-time.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
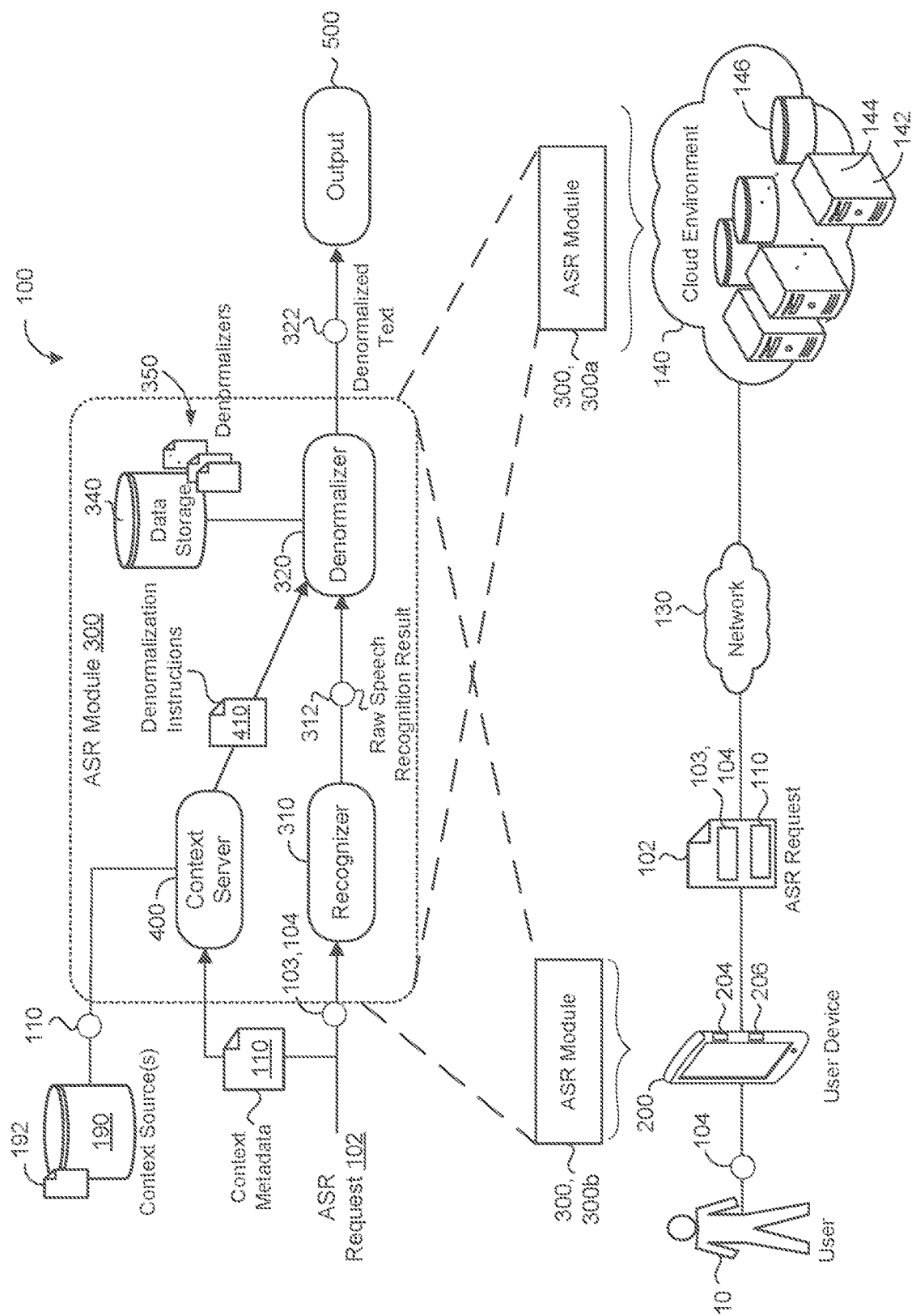
FIG. 1 schematically illustrates an example system for denormalizing r aw speech recognition results from an automatic speech recognition (ASR) module.

The use of denormalizers in automatic speech recognition (ASR) systems is paramount for outputting text that is grammatically correct and optimized for readability. An ASR module is trained on a corpus of text that is "normalized" in that the text is stripped of all punctuation, includes no capital letters, all numbers include verbalized text (e.g. "one-hundred and seventy-seven" instead of "177"), etc. As a result, the trained ASR module upon receiving a spoken utterance during inference, initially generates a raw speech recognition result (e.g., a raw transcription) indicative of "normalized" text. In order to provide the user with a transcription that is optimized for reading, the ASR module employs a list of denormalizers to convert the raw speech recognition result into a more readable form, where a first denormalizer in the set of denormalizer receives the raw speech recognition result and each subsequent denormalizer receives as input a corresponding output of a previous denormalizer in the set of denormalizers. Each denormalizer is associated with a corresponding denormalization rule or denormalization model that performs some aspect of denormalization on an input of text. For instance, a capitalization denormalization rule may convert the phrase "send a message to John" into "Send a message to John", a verbalization denormalization rule will convert all verbalized text (e.g., "sixty-five") into written form (e.g., "65"), an implicit punctuation denormalization rule will add punctuation marks (e.g., convert "thank you sir" to "thank you, sir"), an explicit punctuation denormalization rule will generate punctuation marks (e.g., convert "thanks exclamation mark" to "thanks!"), a transliteration denormalizer will transliterate text into corresponding characters, an ideographic denormalizer will generate an ideographic (e.g., a smiley face emoji) from corresponding text (e.g., ":)"), and an offensive word denormalizer will mask offensive words by replacing one or more letters in offensive words with stars, asterisks, and/or other characters.

Implementations herein are directed toward a single ASR module configured to dynamically apply a contextualized list of denormalizers to a raw speech recognition result for a corresponding speech input based on a context of the speech input. Here, the ASR module may receive the speech input (e.g., speech recognition request) from a user, generate the raw speech recognition result (e.g., normalized text) corresponding to the speech input, obtain context metadata associated with the speech input, and select a list of one or more denormalizers based on the context metadata associated with the speech input for denormalizing the generated raw speech recognition result into denormalized text. The ASR module is configured to apply each denormalizer from the selected list of one or more denormalizers in sequence to the generated raw speech recognition result. Advantageously, a single ASR module including a predefined set of denormalizers may perform speech recognition tasks for an entire user population by using context metadata associated with speech inputs to select a suitable list of one or more denormalizers from the predefined set of denormalizers. Thus, the list of the one or more denormalizers selected based on the context metadata associated with a given speech input personalizes how a raw speech recognition result corresponding to the given speech input is denormalized without requiring multiple ASR modules/engines.

The ASR module may receive the context metadata associated with the speech input from the user when the speech input is received and/or retrieve at least a portion of the context metadata from another source after the speech input is received. The context metadata associated with the speech input may include, without limitation, a speech recognition category associated with the speech input, an application running on a user device that is intended to consume the denormalized text, a user identifier identifying the user, a location of the user at the time the speech input was received, demographic information associated with the user, and/or user preferences for denormalizing text. In some scenarios, the context metadata may include one or more personalized denormalization rules provided by the user for the ASR module to apply on the fly for denormalizing the raw speech recognition result. The ASR module includes in-memory that stores the predefined set of denormalizers and the ASR module may access the appropriate denormalizers therefrom based on the context metadata for denormalizing the raw speech recognition result. For instance, the in-memory may include data storage that maintains a key-value map of the predefined set of denormalizers and the ASR module may retrieve any given denormalizer (i.e., value) from the data store by providing a corresponding key. Optionally, the ASR module may access a separate repository that stores less-frequently used denormalizers and retrieve those denormalizers from the repository as needed, thereby alleviating storage requirements at the ASR module. Additionally or alternatively, the ASR module may receive denormalization instructions that specify custom/personalized denormalizers for the ASR module to retrieve from other sources.

In some examples, the ASR module is configured to use a default list of denormalizers for denormalizing a raw speech recognition result whenever context metadata associated with a corresponding speech input is absent. Thus, when the context metadata associated with the corresponding speech input is available, the ASR module is configured to modify the default list of denormalizers based on the context metadata. Specifically, the ASR module may forward the context metadata to a context server that is configured to generate denormalization instructions for denormalizing the generated raw speech recognition result into the denormalized text based on the context metadata and provide the denormalization instructions to the ASR module. The ASR module may forward the context metadata to the context server without providing the speech input or any audio data associated with the speech input to the context server. Since the context server only has to process context metadata to generate the denormalization instructions, the ASR module may generate the raw speech recognition result while the context server concurrently generates and provides the denormalization instructions to the ASR module without incurring any added latency. Thereafter, the ASR module uses the denormalization instructions to select the list of one or more denormalizers by modifying the default list of denormalizers. For example, the denormalization instructions may instruct the ASR module to modify the default list of denormalizers by at least one of removing one or more denormalizers from the default list of denormalizers, adding one or more new denormalizers to the default list of denormalizers, or specifying a sequence in which to apply each denormalizer in the modified list of denormalizers for denormalizing the generated raw speech recognition result.

In some scenarios, the denormalization instructions include an override instruction that overrides the default list of denormalizers with a new list of denormalizers. In these scenarios, the context server does not have to have knowledge of the default list of denormalizers and may identify each denormalizer in the new list of denormalizers from the predefined set of denormalizers. Regardless of how the context server modifies or overrides the default list of denormalizers, the denormalization instructions only need to include the keys for the ASR module to use for fetching/retrieving each corresponding denormalizer (e.g., value) from the predefined set of denormalizers stored in the data store of the ASR module. In some implementations, the override instruction overrides the default list of denormalizers with one or more personalized denormalizers specific to a given user and not included in the predefined set of denormalizers. In these implementations, the denormalization instructions may include actual data corresponding to the personalized denormalizers for the ASR module to apply on the fly or the denormalization instructions may include corresponding keys for the ASR module to use for fetching the personalized denormalizers from a personalized denormalizer repository.

Referring to FIG. 1, in some implementations, a system 100 includes a user device 200 associated with a user 10, who may communicate, via a network 130, with a remote system 140. The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the remote system 140 executes an automatic speech recognition (ASR) module 300, 300a configured to receive audio data 103 corresponding to a speech input 104 from the user device 200, generate a raw speech recognition result 312 corresponding to the speech input 104, and denormalize the generated raw speech recognition result 312 into denormalized text 322. As used herein, the raw speech recognition result 312 corresponds to normalized text converted from the audio data 103 corresponding to the speech input 104 in which the text is verbalized and stripped of all punctuation and capitalization. Conversely, the denormalized text 322 includes a conversion of the raw speech recognition result 312 into a form that is more readable to a user 10. For instance, denormalizing the raw speech recognition result 312 into the denormalized text 322 may include verbalizing spelled out numbers (e.g., convert "one-hundred and seventy-seven" into "177"), capitalizing appropriate letters (e.g., "send a text to john" into "Send a text to John"), and adding punctuation (e.g., convert "thanks exclamation mark" to "thanks!").

The user device 200 includes data processing hardware 204 and memory hardware 206. The user device 200 may include an audio capture device (e.g., microphone) for capturing and converting the speech input 104 from the user 10 into the audio data 103 (e.g., electrical signals). In some implementations, the data processing hardware 204 is configured to execute an ASR module 300, 300b instead of or in lieu of the ASR module 300a executing on the remote system 140. The user device 200 can be any computing device capable of communicating with the remote system 140 through the network 130. The user device 200 includes, but is not limited to, desktop computing devices and mobile computing devices, such as laptops, tablets, smart phones, and wearable computing devices (e.g., headsets and/or watches).

In the example shown, the user 10 may provide the speech input 104 to the user device 200 by speaking and the user device 200 can capture and convert the speech input 104 into the audio data 103. The user device 200 may then transmit an ASR request 102 that includes the audio data 103 and context metadata 110 associated with the speech input 104 to the ASR module 300a executing on the remote system 140. Here, the ASR request 102 requests the ASR 300 to annotate the speech input 104 into corresponding denormalized text 322 based on the context metadata 110 associated with the speech input 104. The user device 200 may optionally execute the ASR module 300b to annotate the speech input 104 into the corresponding denormalized text 322. For instance, when network communications are down or not available, the user device 200 may execute the ASR module 300b locally to annotate the captured speech input 104 into the corresponding denormalized text 322.

The ASR module 300 includes a recognizer 310, a denormalizer module 320. data storage 340, and a context server 400. While the context server 400 is shown as a component of the ASR module 300, the context server 400 may be a separate component in communication with the ASR module 300 in other examples without departing from the scope of the present disclosure. The ASR module 300 is configured to receive the ASR request 102 and provide the audio data 103 corresponding to the speech input 104 to the recognizer 310 and forward the context metadata 110 to the context server 400. Here, the recognizer 310 is configured to generate the raw speech recognition result 312 (e.g., normalized text) corresponding to the speech input 104, while at the same time, the context server 400 is configured to generate denormalization instructions 410 based on the context metadata 110 for denormalizing the raw speech recognition result 312. Thus, as neither the speech input 104 nor the audio data 103 associated with the speech input 104 are provided to the context server 400, the context server 400 only has to process the context metadata 110 to generate the denormalization instructions 410. As a result, the ASR module 300 is capable of generating the denormalization instructions 410 via the context server 400 and the raw speech recognition result 312 via the recognizer 310 simultaneously without incurring added latency.

The data storage 340 (e.g., memory hardware) of the ASR module 300 stores a predefined set of denormalizers 350 each corresponding to a respective denormalization rule or denormalization model that performs some aspect of denormalization on an input of normalized text (e.g., raw speech recognition result 312) received at the denormalizer module 320. For instance, the predefined set of denormalizers 350 may include, without limitation, at least one of a capitalization denormalizer, a verbalization denormalizer, an implicit punctuation denormalizer, an explicit punctuation denormalizer, a transliteration denormalizer, an ideographic denormalizer, or an offensive word denormalizer.

The denormalizer module 320 is configured to select a list of one or more denormalizers 350 to apply to the raw speech recognition result 312 based on the context metadata 110 associated with the speech input 104. More specifically, the denormalizer module 320 uses the denormalization instructions 410 generated by the context server 400 to select the list of the one or more denormalizers 350 to apply for denormalizing the raw speech recognition result 312. In some examples, the denormalization instructions 410 identify the list of the one or more denormalizers 350 for the denormalizer module 320 to select by retrieving the corresponding denormalizers 350 from the predefined set of denormalizers 350 stored within the data storage 340. In these examples, the instructions 410 identify each denormalizer and provide a corresponding key 344 (FIG. 3) that the denormalizer module 320 uses to retrieve the corresponding denormalizer 350 from the data storage 340. In other examples, the denormalization instructions 410 identify other denormalizers, such as custom/personalized denormalizers 450 (FIGS. 4A and 4b) compiled on the fly for a specific user 10 or infrequently used denormalizers, which are not among the predefined set of denormalizers 350 within the data storage 340. In some implementations, personalized denormalizers 450 associated with a specific user 10 are encrypted and the denormalizer module 320 can only decrypt the personalized denormalizers when the user 10 provides a suitable decryption key.

The context metadata 110 obtained by the context server 400 includes at least one of a speech recognition category associated with the speech input 104, an application running on the user device 200 associated with the user 10, a location of the user 10 at the time the speech input 104 was received by the ASR module 300, a user identifier identifying the user, demographic information associated with the user 10, or user preferences for denormalizing text.

The speech recognition category associated with the speech input 104 may indicate whether the speech input 104 is to be convened into text for dictation or whether the speech input 104 is provided as a voice search or command for the user device 200 to execute. In the case of the latter, the ASR module 300 converts the speech input 104 into the denormalized text 322 for display on the user device 200 as an annotation of the voice search or command specified by the speech input 104. The speech recognition category associated with the speech input 104 can include other categories such as, but not limited to, transcribing the speech input 104 as part of a conversation, audio/video conference, or voice mail recording. As will become apparent, the speech recognition category associated with the speech input 104 can determine which denormalizers 350 the denormalizer module 320 selects for denormalizing the raw speech recognition result 312. Put another way, the denormalizer module 320 may denormalize the same raw speech recognition result 312 differently based on the speech recognition category associated with the corresponding speech input 104.

When the context metadata 110 includes an identifier of an application running on the user device 200 associated with the user 10, the context server 400 may be able to discern the speech recognition category associated with the speech input. For instance, a dictation application presently open and running on the user device 200 can indicate that the user 10 is dictating the speech input 104. Context metadata 110 including the location of the user 10 when the speech input 104 was received by the ASR module 300 can be used by the context server 400 to discern the prominent language and/or dialect spoken at the location. For instance, a transliteration denormalizer may be applied when the user 10 is located in Japan to convert text into corresponding characters, while a different transliteration denormalizer or no transliteration denormalizer may be applied when the user 10 is located somewhere else. The location within the context metadata 110 may include a geographical area so that the user's 10 exact geographic position cannot be determined. Moreover, the user must explicitly consent to providing location information, and have the ability to opt out of sharing location information at any time.

When the ASR request 102 provides context metadata 110 including the user identifier identifying the user, the context server 400 may use the user identifier to obtain additional context metadata 110 from one or more context sources 190. For instance, the context server 400 may retrieve context metadata 110 from a user profile 192 associated with the user 10 using the user identifier. The user profile 192 may include demographic information associated with the user 10 such as age, gender, residence, spoken languages), education, occupation, etc. The user 10 voluntarily provides and consents to storing the demographic information for use by the ASR module 300 and has the option of removing the demographic information at any time. In some examples, the context server 400 discerns the prominent language and/or dialect spoken by the user 10 by analyzing the demographic information within the user profile 192 associated with the user 10 in lieu of or in addition to the location of the user 10. The user profile 192 may further include user preferences for denormalizing text. For instance, the denormalizer module 320 may apply the offensive word denormalizer to mask offensive words in text by default, but the user preferences for denormalizing text may explicitly indicate that offensive words should not be masked Thus, the context server 400 may specify in the denormalization instructions 410 that the denormalizer module 320 should not apply the offensive word denormalizer when denormalizing raw speech recognition results 312 for this specific user 10. Accordingly, the context server 400 may receive some or all of the context metadata 110 when the ASR request 102 is received and may retrieve other context metadata 110 from the context source(s) 190 by accessing a user profile 192 associated with the user identifier identifying the user 10.

Figure 5:
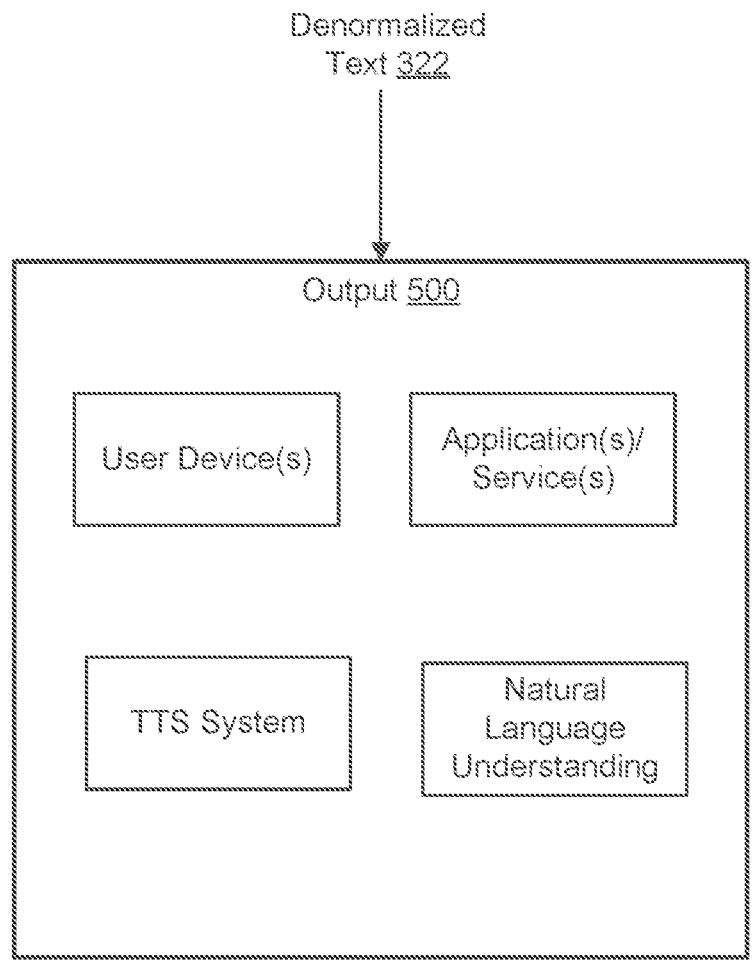
FIG. 5 is a schematic view of an example output receiving denormalized text.

After denormalizing the raw speech recognition result 312, the denormalizer module 320 may provide the denormalized text 322 to an output 500 configured display and/or consume the denormalized text 322 in some other manner. Referring to FIG. 5, the output 500 may include the user device 200 and/or one or more other user devices capable of presenting the denormalized text 322 for a user to read. The output 500 may additionally or alternatively include one or more applications/services executing on the remote system 140. For instance, the speech input 104 may include an input to a message board service executing on the remote system 140 that user devices may access to view the denormalized text 322 corresponding to the speech input 104. The output 500 could further include a transcription service that provides the denormalized text 322 corresponding to transcribed speech for one or more speakers in a telecommunication conferencing session. Additionally or alternatively, the output 500 may include other systems/modules that consume the denormalized text 322 for uses other than human readability. For instance, the output 500 could include a text-to-speech system that receives the denormalized text 322 and generates synthesized speech. Here, the denormalized text 322 may include prosody and/or pronunciation tags from a corresponding denormalizer for the TTS system to apply when generating synthesized speech. In another example, the output 500 could include a natural language understanding (NLU) module that uses the denormalized text 322 to understand what the user wants. In some examples, the denormalized text 322 consumed by outputs 500 for non-human uses (e.g., the TTS system and the NLU module) is not denormalized for readability, but is rather denormalized/normalized in a manner more suitable for processing by the corresponding output 500.

Figure 2A:
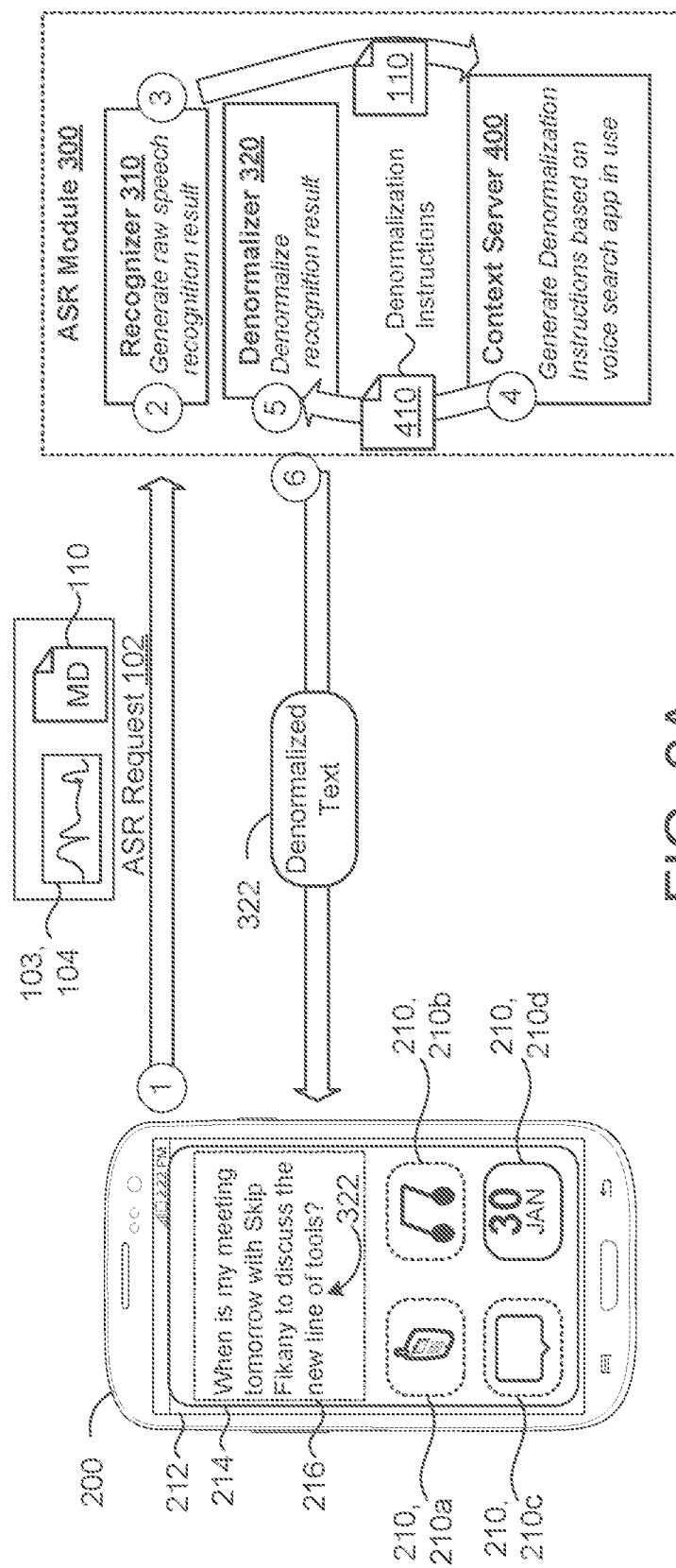
FIGS. 2A and 2B are schematic views of the ASR module of FIG. 1 denormalizing text based on context metadata from a user device and sending the denormalized text to the user device.
Figure 2B:
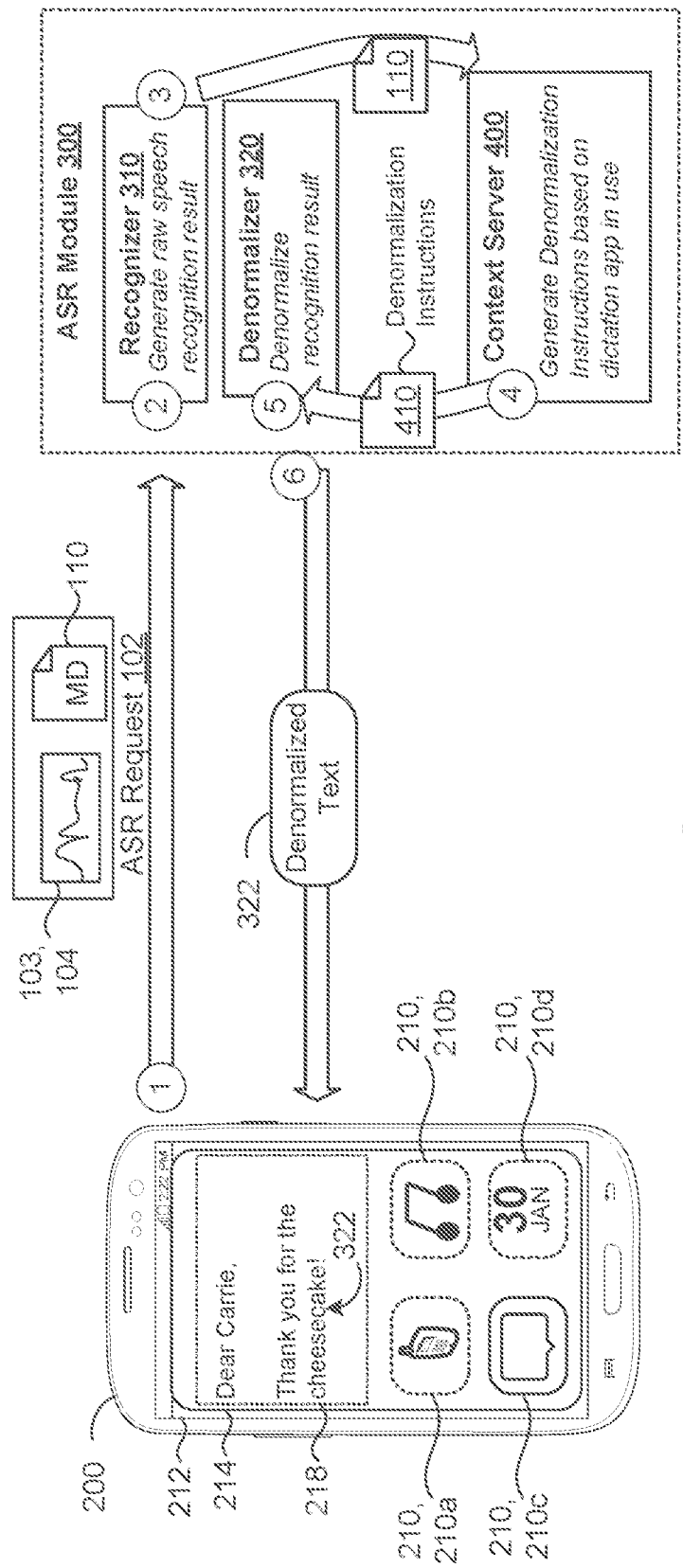

FIGS. 2A and 2B show an example user device 200 sending an ASR request 102 to an ASR module 300 and receiving denormalized text 322 back from the ASR module 300. The user device 200 includes a screen 212 and executes a graphical user interface 214 for display on the screen 212. The user device 200 further executes one or more software applications 210, 210*a*-*d*. A software application 210 may refer to computer software that, when executed by a computing device, causes the computing device to perform a task. In some examples, the software application 210 may be referred to as an "application", an "app", or a "program". Example software applications 210 include, but are not limited to, voice communication applications 210*a*, media streaming applications 210*b*, messaging applications 210*c*, calendar applications 210*d*, word processing applications, spreadsheet applications, social networking applications, and games.

FIG. 2A shows the user device 200 presently executing a calendar application 210*d* (denoted by solid lines) and sending, at time 1, an ASR request 102 to the ASR module 300 that includes audio data 103 and context metadata 110 associated with a speech input 104. Here, the speech input 104 corresponds to a voice search directed to the calendar application 210*d* to determine when a meeting time is recorded for a topic (discuss new line of tools) with a given individual (Skip Fikany) on a given day (tomorrow). Among other types of metadata, the context metadata 110 associated with the speech input 104 and provided in the ASR request 102 includes an application identifier identifying that the calendar application 210*d* is currently executing on the user device 200 and/or the speech input 104 was directed toward the calendar application 210*d*.

At time 2, the recognizer 310 generates the raw speech recognition result 312 corresponding to the speech input 104, and at time 3, forwards the context metadata 110 to the context server 400. Times 2 and 3 may occur concurrently or simultaneously with time 3 occurring after or before time 2. The raw speech recognition result 312 may include normalized text that recites "when is my meeting tomorrow with skip fikany to discuss the new line of tools". While the normalized text can be used by the calendar application 210*d* to execute the search to determine the time of the meeting, the normalized text is not optimized for readability by a user. Using the context metadata 110 including the application identifier identifying the calendar application 210*d*, the context server 400 is able to discern that the speech recognition category associated with the speech input 104 indicates that the speech input 104 is provided as a voice search for the user device 200 to execute by accessing the calendar application 210*d*. Accordingly, at time 4, the context server 400 generates the denormalization instructions 410 based on the context metadata 110 indicating the voice-search application (e.g., the calendar application 210*d*) is currently executing on the user device 200 and provides the denormalization instructions 410 to the denormalizer module 320.

The denormalizer module 320 uses the denormalization instructions 410 to select a list of one or more denormalizers 350 to apply to the generated raw speech recognition result 312. For instance, the denormalization instructions 410 may specify the list of the one or more denormalizers 350 and the denormalizer module 320 may select the one or more denormalizers 350 from the predefined set of denormalizers 350 within the data storage 340. Since, the context metadata 110 indicates the speech input 104 is associated with a voice-search application (e.g., the calendar application 210*d*), the context server 400 will generate denormalization instructions 410 that ensure that the denormalizer module 320 will not apply an explicit punctuation denormalizer because none of the terms in the speech input 104 for the voice search are likely to include explicit punctuation terms. Thus, in the present example, the denormalization instructions 410 would instruct the denormalization module 320 to remove the explicit punctuation denormalizer from a default list of denormalizers or the denormalization instructions 410 would not instruct the denormalization module 320 to include the explicit punctuation denormalizer when there is no default list or the default list does not include the explicit punctuation denormalizer. The list of the one or more denormalizers indicates the sequence in which the denormalizers should be applied such that a first denormalizer is applied to the raw speech recognition result 312 and each subsequent denormalizer receives as input the output from the previous denormalizer. At time 5, the denormalizer module 320 denormalizers the raw speech recognition result 312 into denormalized text 322 by applying the list of the one or more denormalizers 350 in sequence to the generated raw speech recognition result 312.

At time 6, the ASR module 300 provides the denormalized text 322 corresponding to the speech input 104 to the user device 200 and the user device 200 displays the denormalized text 322 in a voice search/command window 216 displayed in the graphical user interface 214. Here, the denormalized text 322 merely annotates the speech input 104 corresponding to the voice search directed to the calendar application 210*d*. In the example shown, the denormalized text 322 was denormalized by at least a capitalization denormalizer and an implicit denormalizer. For instance, the denormalizer module 320 applied the capitalization denormalizer to capitalize the first letter "W" beginning the voice search, the first letter "S" of the individuals first name (Skip), and the first letter "F" of the individuals last name (Fikany). The implicit denormalizer added a question mark "?" at the end of the voice search because the speech input 104 is phrased as a question. Notably, since the denormalizer module 320 did not apply the explicit punctuation denormalizer to the raw speech recognition result 312, the term "new line" in the raw speech recognition result 312 is included in the denormalized text 322 and not converted into dictated text that would incorrectly omit the term "new line" and instead start a new line n/ after the term "discuss" that begins with the term "of tools". In some examples, the ASR module 300 streams the denormalized text 322 to the user device 200 (or other output 500) in real-time so that the denormalized text 322 displays while the user 10 is uttering speech.

FIG. 2B shows the user device 200 presently executing a messaging application 210c (denoted by solid lines) and sending, at time 1, an ASR request 102 to the ASR module 300 that includes audio data 103 and context metadata 110 associated with a speech input 104. Here, the speech input 104 corresponds to dictated speech directed to the messaging application 210c to include in an electronic message. Among other types of metadata, the context metadata 110 associated with the speech input 104 and provided in the ASR request 102 includes an application identifier identifying that the messaging application 210c is currently executing on the user device 200 and/or the speech input 104 was provided to the messaging application 210c.

At time 2, the recognizer 310 generates the raw speech recognition result 312 corresponding to the speech input 104, and at time 3, forwards the context metadata 110 to the context server 400. Times 2 and 3 may occur concurrently or simultaneously with time 3 occurring after or before time 2. The raw speech recognition result 312 may include normalized text that recites "dear carrie comma new line thank you for the cheesecake exclamation point". Using the context metadata 110 including the application identifier identifying the messaging application 210c, the context server 400 is able to discern that the speech recognition category associated with the speech input 104 indicates that the speech input 104 is provided as dictated speech for the messaging application 210c executing on the user device 200 to convert into text. Accordingly, at time 4, the context server 400 generates the denormalization instructions 410 based on the context metadata 110 indicating a dictation application (e.g., the messaging application 210c) is currently executing on the user device 200 and provides the denormalization instructions 410 to the denormalizer module 320. Here, the context server 400 will generate denormalization instructions 410 that ensure that the denormalizer module 320 will apply the explicit punctuation denormalizer because the speech input 104 likely includes explicit punctuation terms. For instance, the denormalization instructions 410 may instruct the denormalizer module 320 to include the explicit punctuation denormalizer when there is no default list of denormalizers or the default list does not include the explicit punctuation denormalizer. At time 5, the denormalizer module 320 denormalizers the raw speech recognition result 312 into denormalized text 322 by applying the list of the one or more denormalizers 350 in sequence to the generated raw speech recognition result 312.

At time 6, the ASR module 300 provides the denormalized text 322 corresponding to the speech input 104 to the user device 200 and the user device 200 displays the denormalized text 322 in a message/dictation window 218 displayed in the graphical user interface 214. In the example shown, the denormalized text 322 was denormalized by at least the explicit punctuation denormalizer and the capitalization denormalizer. For instance, the explicit punctuation denormalizer converts the term "comma" in the raw speech recognition result 312 into the corresponding symbol "," and recognizes the term "new line" as an instruction to start a new line beginning with "Thank you". After the explicit punctuation denormalizer is applied, the denormalizer module 320 applies the capitalization denormalizer by capitalizing the first letter "D" of the first line, the first letter "C" of the addressee's first name (Carrie), and the first letter "T" of the second line. Notably, if the capitalization denormalizer were applied before the explicit punctuation denormalizer, the "T" would likely not be capitalized since it would not be identifiable as a beginning letter of a line.

The examples of FIGS. 2A and 2B use the exact same ASR module 300 having access to the same predefined set of denormalizers 350. The recognizer 310 is trained on the same normalized text and will generate the same raw speech recognition result 312 for a given speech input 104 regardless of what the associated context metadata 110 includes. However, the context server 400 uses the context metadata 110 associated with the speech input 104 to personalize/contextualize the denormalization of the raw speech recognition result 312 generated by the recognizer 310 into denormalized text for optimal readability.

Figure 3:
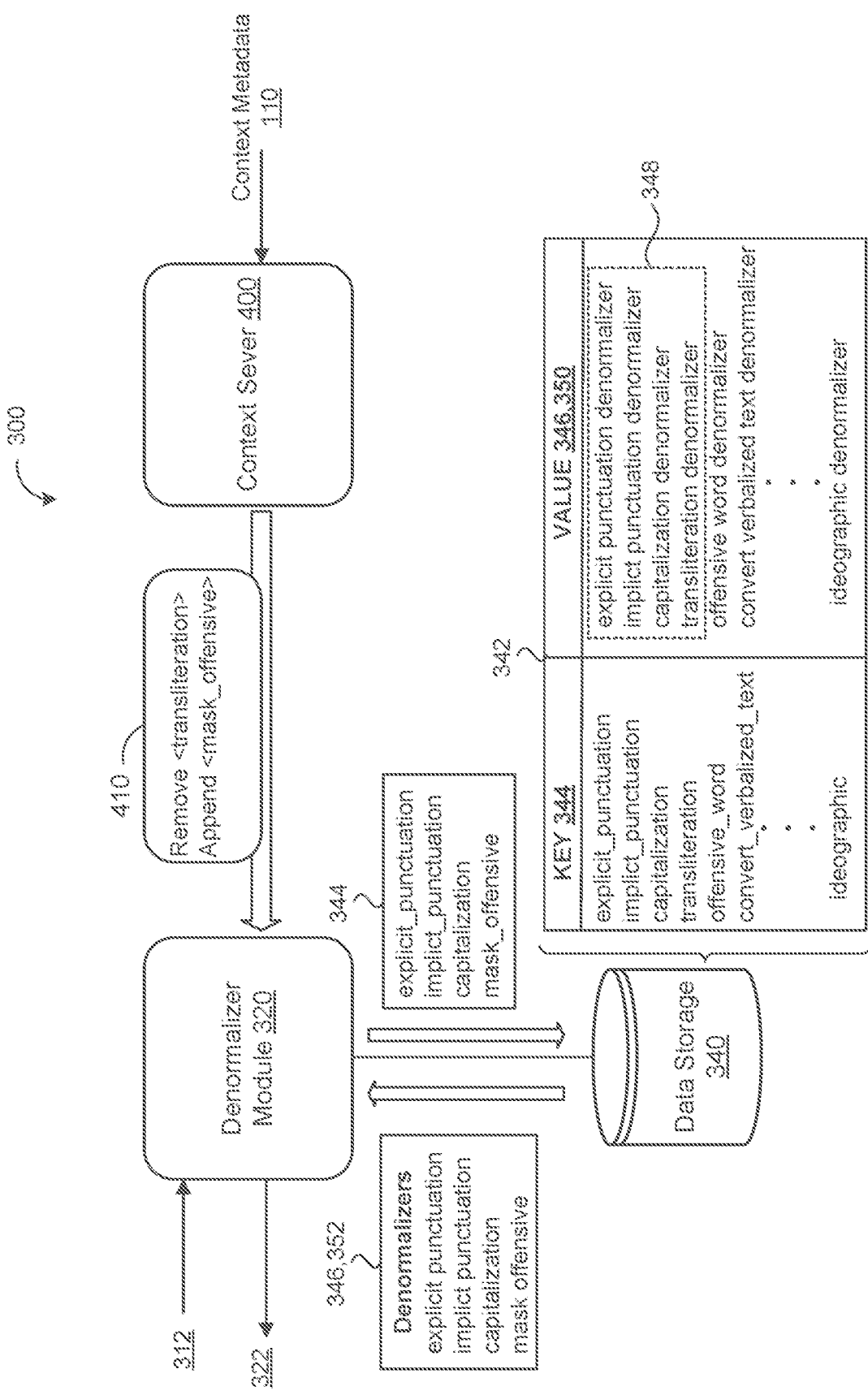
FIG. 3 schematically illustrates a context server providing denormalization instructions to a denormalizer module for denormalizing a raw speech recognition result.

FIG. 3 illustrates an example interaction between the denormalizer module 320, the data storage 340, and the context server 400 of the ASR module 300. The data storage 340 stores the predefined set of denormalizers 350 each corresponding to a respective denormalization rule or denormalization model that performs some aspect of denormalization on an input of normalized text received at the denormalizer module 320. The denormalizer module 320 may be initialized with a default list of denormalizers 348 to apply for denormalizing speech recognition results 312 when context metadata 110 is absent and/or the context server 400 does not provide any denormalization instructions 410. In the example shown, the default list of denormalizers 348 includes the explicit punctuation, implicit punctuation, the capitalization, and transliteration denormalizers. The data storage 340 maintains a key-value map 342 of the predefined set of denormalizers 350 accessible to the denormalizer module 320 for selecting/retrieving any given denormalizer (i.e., value 346) from the data storage 340 by providing a corresponding key 344.

In response to receiving denormalization instructions 410 from the context server 400, the denormalizer module 320 may select a list of one more denormalizers 350 to apply for denormalizing normalized text 322 by modifying the default list of denormalizers 348 based on the denormalization instructions 410. In some implementations, modifying the default list of denormalizers 348 includes removing one or more denormalizers from the default list of denormalizers 348 and/or adding one or more denormalizers front the predefined set of denormalizers 350 to the default list of denormalizers 348. For instance, the denormalization instructions 410 include one or more of a prepend denormalizer instruction, an append denormalizer instruction, a remove denormalizer instruction, a substitute denormalizer instruction, or an add denormalizer instruction. The append and prepend denormalizer instructions may be beneficial when the context server 400 does not have knowledge of the default list of denormalizers 348. The prepend denormalizer instruction identifies a new denormalizer (e.g., from the predefined set of denormalizers 350) to prepend at a beginning of the default list of denormalizers 348, while the append denormalizer identifies a new denormalizer to append at the end of the default list of denormalizers. The remove denormalizer instruction identifies an existing denormalizer to be removed from the default list of denormalizers 348 and the substitute denormalizer instruction identifies a new denormalizer to replace an existing denormalizer from the default list of denormalizers 348. The add denormalizer instruction identifies a new denormalizer to add to the default list of denormalizers and identifies an existing denormalizer from the default list of denormalizers that precedes or follows the new denormalizer.

In some implementations, the context server 400 provides denormalization instructions 410 that include the remove denormalizer instruction instructing the denormalizer module 320 to remove the transliteration denormalizer from the default list of denormalizers 348 and the append denormalization instruction instructing the denormalizer module 320 to append the offensive word denormalizer to the default list of denormalizers 348. Here, the remove instruction includes the corresponding transliteration key 344 that identifies the transliteration denormalizer to be removed from the default list of denormalizers 348 and the append instruction includes the corresponding offensive word key 344 that identifies the offensive word denormalizer to be appended to the default list of denormalizers 348.

In the example shown, the denormalizer module 320 is configured to use the denormalization instructions 410 received from the context server 400 to modify the default list of denormalizers 348. For instance, since the denormalization instructions 410 specify that the transliteration denormalizer should be removed and the offensive word denormalizer should be appended, the denormalizer module 320 retrieves, from the key-value map 342, the remaining explicit punctuation, implicit punctuation, and capitalization denormalizers from the default list of denormalizers 348 and the offensive word denormalizer from the predefined set of denormalizers 350 by providing the corresponding keys 344 to the data storage 340.

In some examples, the denormalizer module 320 provides the corresponding keys 344 in the sequence associated with the order/sequence in which the corresponding denormalizers are going to be applied for denormalizing the raw speech recognition result 312 into the denormalized text 322. Thus, by providing the corresponding keys 344, the denormalizer module 320 retrieves the selected list of denormalizers 352 corresponding to the explicit punctuation, implicit punctuation, capitalization, and mask offensive denormalizers. Thereafter, the denormalizer module 320 will denormalize the raw speech recognition result 312 into the denormalized text 322 by applying the explicit punctuation denormalizer to the raw speech recognition result 312, applying the implicit punctuation denormalizer to the output of the explicit punctuation denormalizer, applying the capitalization denormalizer to the output of the implicit punctuation denormalizer, and applying the mask offensive denormalizer to the output of the capitalization denormalizer.

Figure 4A:
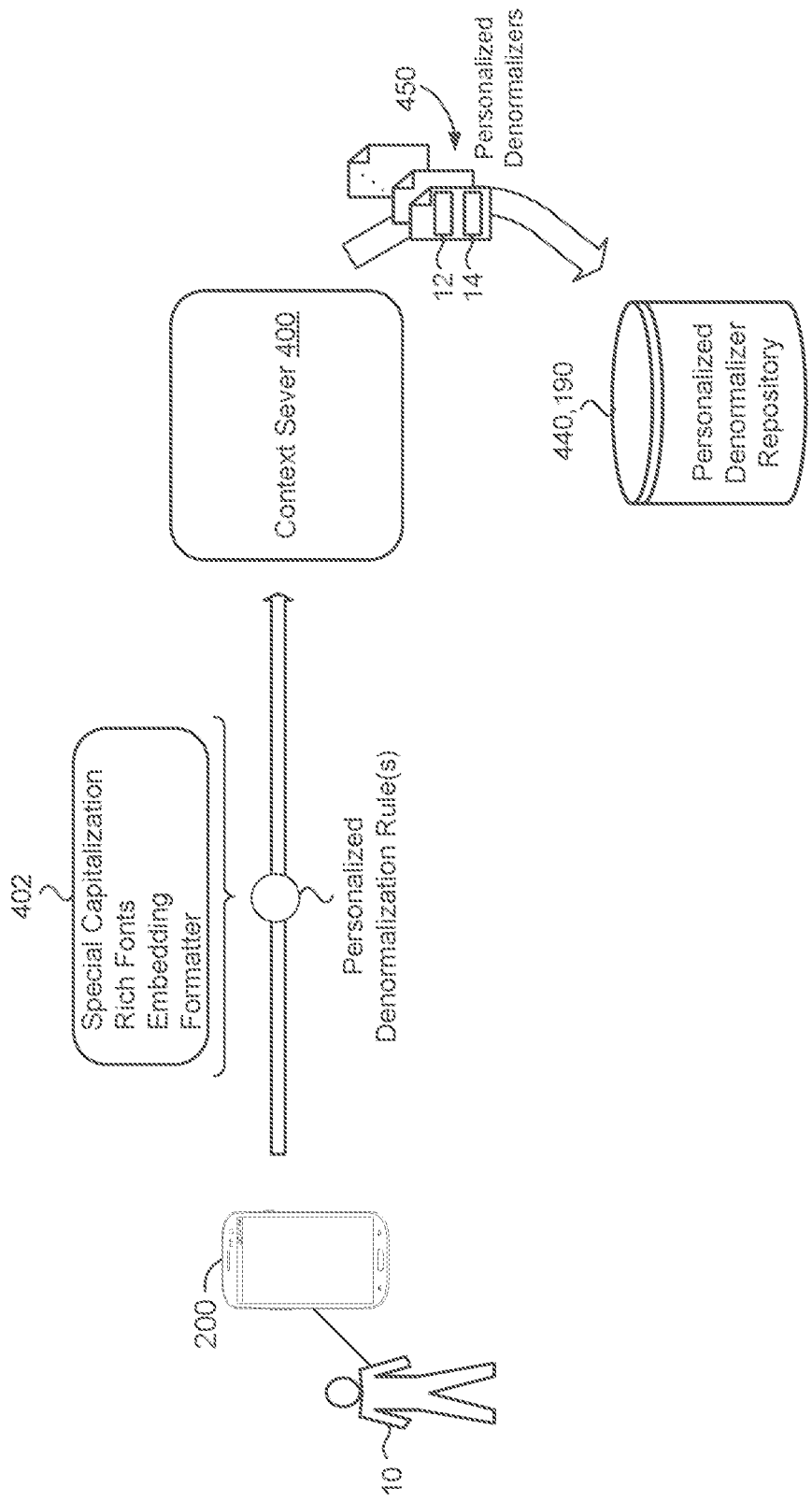
FIGS. 4A and 4B are schematic views of a context server compiling personalized denormalizers for a user based on personalized denormalization rules received from a user device associated with the user.

Referring to FIG. 4A, in some implementations, the context server 400 compiles personalized denormalizers 450 for specific users 10 that are not included in the predefined set of denormalizers 350 stored in the data storage 340 (e.g., memory hardware) of the ASR module 300. Here, a user 10 or third-party client can provide one or more personalized denormalization rules 402 to the context server 400 that the user 10 (or third-party client) would like to apply for denormalizing raw speech recognition results 312. For instance, a denormalization rule 402 may be implemented by the user 10 and include any personalized/custom denormalization rule specified by the user 10 for denormalizing text such as special capitalization, rich fonts, embedding (e.g., a link to a website), a formatter to fit a particular rendering constraint (e.g., shorter lines/tabs), etc.

In response to receiving one or more denormalization rules 402 (e.g., custom/personalized denormalization rules) from a specific user 10, the context server 400 compiles a corresponding personalized denormalizer 450 for each denormalization rule 402 and stores the one or more personalized denormalizers 450 in a personalized denormalizer repository 440 which may correspond to one of the context sources 190 of FIG. 1. The personalized denormalizers 450 specific to the user 10 may include a user identifier 12 identifying the user 10. Accordingly, when the user 10 provides a subsequent ASR request 102 with context metadata 110 including the user identifier 12, the context server 400 may identify any personalized denormalizers 450 stored in the repository 440 (e.g., context source 190) that match the user identifier 12. The context server 400 may then generate denormalization instructions 410 that instruct the denormalizer module 320 to apply the personalized denormalizers 450. In some examples, the context server 400 encrypts the personalized denormalizers 450 associated with the user 10 and applies a cryptographic hash 14 that identifies a cryptographic key that the user 10 must provide in order for the denormalizer module 320 to decrypt and use the personalized denormalizers 450. For instance, the user 10 may provide the cryptographic key as part of the context metadata 110 in an ASR request 102 for converting a corresponding speech input 104 into denormalized text 322.

In some implementations, the personalized denormalizer repository 440 is separate from the ASR module 300 so that personalized denormalizers 450 (e.g., custom denormalizers) can be compiled and stored dynamically without having to wait for periodic updates to the ASR module 300. Additionally, since the personalized denormalizer repository 440 could potentially store respective sets of one or more personalized denormalizers 450 for millions of different users, it is not ideal for the data storage 340 at the ASK module 300 to also store and provide access to all of these personalized denormalizers 450 in addition to the predefined set of denormalizers 350 that is accessible to the entire user population. In some scenarios, the personalized denormalizer repository 440 may store personalized denormalizers 450 and roll out the personalized denormalizers to the data storage 340 of the ASR module 300 during a next periodic (e.g., weekly) update of ASR module 300. In some examples, the personalized denormalizer repository 440 is integrated with the data storage 340 on the ASR module 300 without comingling the personalized denormalizers 450 with the predefined set of denormalizers 350.

Figure 4B:
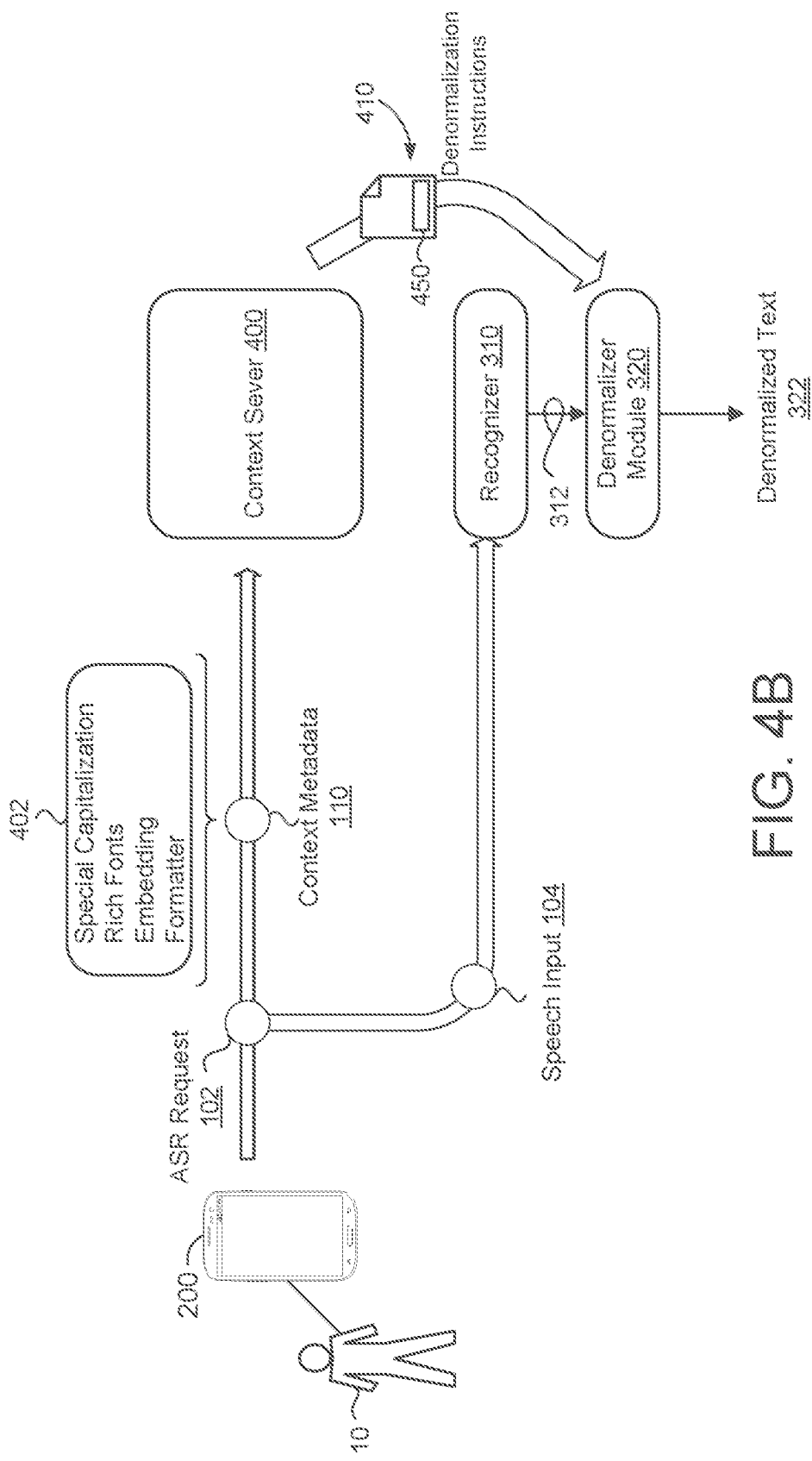

Referring to FIG. 4B, in some implementations, the user 10 provides, via the user device 200, an ASR request 102 that includes the one or more personalized denormalization rules 402 as part of the context metadata 110 of the ASR request 102. In this scenario, the user 10 is requesting the ASR module 300 to apply the one or more denormalization rules 402 on the fly. In the example shown, the context metadata 110 including the one or more personalized denormalization rules 402 is provided to the context server 400 and the speech input 104 is provided to the recognizer 310. The recognizer 310 generates a raw speech recognition result 312 corresponding the speech input 104. Meanwhile, the context server 400 is configured to compile a corresponding personalized denormalizer 450 for each denormalization rule 402 and generate denormalization instructions 410 that include the personalized denormalizer(s) 450 for denormalizing the raw speech recognition result 312 corresponding to the speech input 104. Accordingly, the context server 400 provides the denormalization instructions 410 including the personalized denormalizer(s) 450 to the denormalizer module 320 and the denormalizer module 320 applies the personalized denormalizers 450 on the fly to denormalize the raw speech recognition result 312 into the corresponding denormalized text 322.

In some implementations, the user 10 could include an administrator of the ASR module 300 that provides personalized denormalization rules 402 associated with new denormalizers the administrator wants to test without having to update the predefined set of denormalizers 350 or other aspects of the ASR module 300. For instance, the personalized denormalization rules 402 may cause the context server 400 to compile the new denormalizers and generate instructions 410 instructing the denormalizer module 320 use the new denormalizers for denormalizing text. Accordingly, providing personalized denormalization rules 402 on the fly is valuable for debugging new denormalizers before rolling them out to the ASR module 300.

Figure 6:
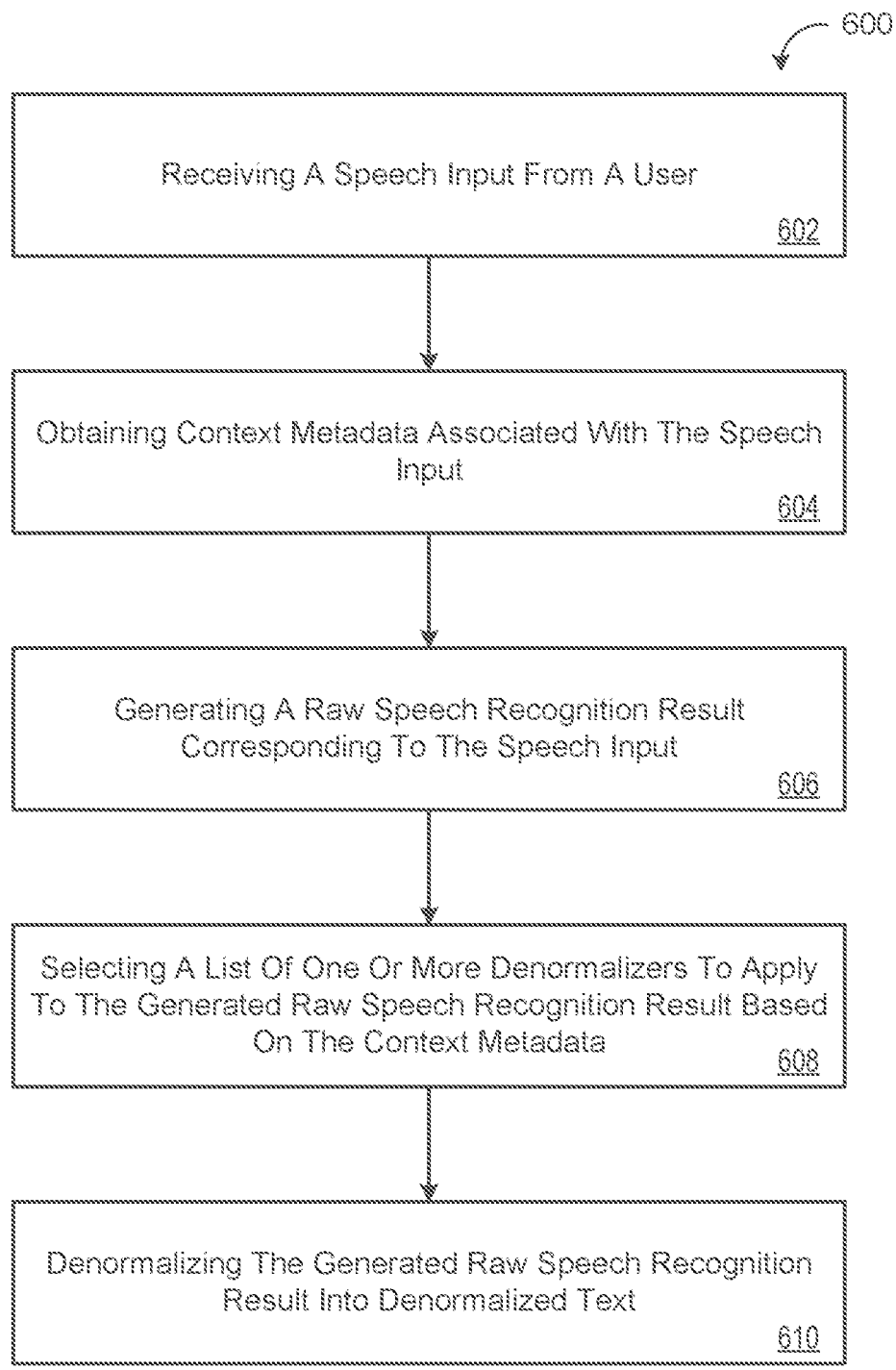
FIG. 6 is a flowchart of an example arrangement of operations for a method of denormalizing raw speech recognition results.

FIG. 6 is a flowchart of an example arrangement of operations for a method 600 of denormalizing a raw speech recognition result generated by a denormalizer module 320 of an ASR module 300. At operation 602, the method 600 includes receiving a speech input 104 from a user 10 at data processing hardware 204, 144 of the ASR module 300. The user 10 may be associated with a user device 200 that provides the speech input 104 as part of a speech recognition request 102 to the ASR module 300. The ASR module 300 may reside on the user device 200 and/or a distributed system 140.

At operation 604, the method 600 includes obtaining, by the data processing hardware 204, 144, context metadata 110 associated with the speech input 104. The context metadata 110 may be received from the user device 200 when audio data 103 for the speech input 104 is received at the data processing hardware 204, 144. In other examples, obtaining the context metadata 110 includes receiving a user identifier 12 associated with the user 10 when the speech input 104 is received and retrieving the context metadata 110 from memory hardware 206, 146 using the user identifier 12. The context metadata may include at least one of a speech recognition category (e.g., dictation or voice search) associated with the speech input. An application running on the user device 200, a location of the user at the time the speech input 104 was received, the user identifier 12, demographic information associated with the user, or user preferences for denormalizing text. For instance, the user preferences may include one or more personalized denormalization rules 402.

At operation 606, the method 600 includes generating, by the data processing hardware 204, 144, a raw speech recognition result 312 corresponding to the speech input 104. The generated raw speech recognition result 312 includes normalized text. For instance, normalized text refers to text in which all capitalization and punctuation is stripped. For instance, as a recognizer 310 of the ASR module 300 is typically trained on a corpus of text that is normalized, the recognizer 310 will output raw speech recognition results 312 that are normalized.

At operation 608, the method 600 includes selecting a list of one or more denormalizers 352 to apply to the generated raw speech recognition result 312 result based on the context metadata 110 associated with the speech input 104. Selecting the list of the one or more denormalizers 352 may include modifying a default list of denormalizers 348 from a predefined set of denormalizers 350 by at least one of removing one or more denormalizers from the default list of denormalizers 348 or adding one or more denormalizers from the predefined set of denormalizers 350 to the default list of denormalizers.

At operation 610, the method 600 includes denormalizing the generated raw speech recognition result 312 into denormalized text 322 by applying the list of the one or more denormalizers 352 in sequence to the generated raw speech recognition result 312. In some examples, a context server 400 generates denormalization instructions 410 based on the context metadata 110 for denormalizing the generated raw speech recognition result 312 into the denormalized text 322. Here, a denormalizer module 320 of the ASK module 300 may receive the denormalization instructions 410 from the context server 400 and select the list of the one or more denormalizers 352 using the denormalization instructions 410. For instance, the denormalizer module 320 may retrieve each denormalizer of the selected list of the one or more denormalizers 350 from memory hardware (e.g., data storage 340) using a corresponding key 344. The denormalization instructions 410 may identify the required denormalizer(s) to select by providing their corresponding keys 344. Thereafter, the denormalizer module 320 is configured to apply each denormalizer of the selected list of the one or more denormalizers 352 retrieved from the memory hardware 340 in sequence to the generated raw speech recognition result 312.

The ASR module 300 may transmit the denormalized text 322 to an output 500. The output 500 may include any of the outputs 500 described above with reference to FIG. 5. For instance, the output 500 could include a client device such as the user device 200 or another user device that displays the denormalized text 322 on a display screen 212 of the client device 200. In some examples, the denormalized text 322 streams to the output 500 in real-time.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
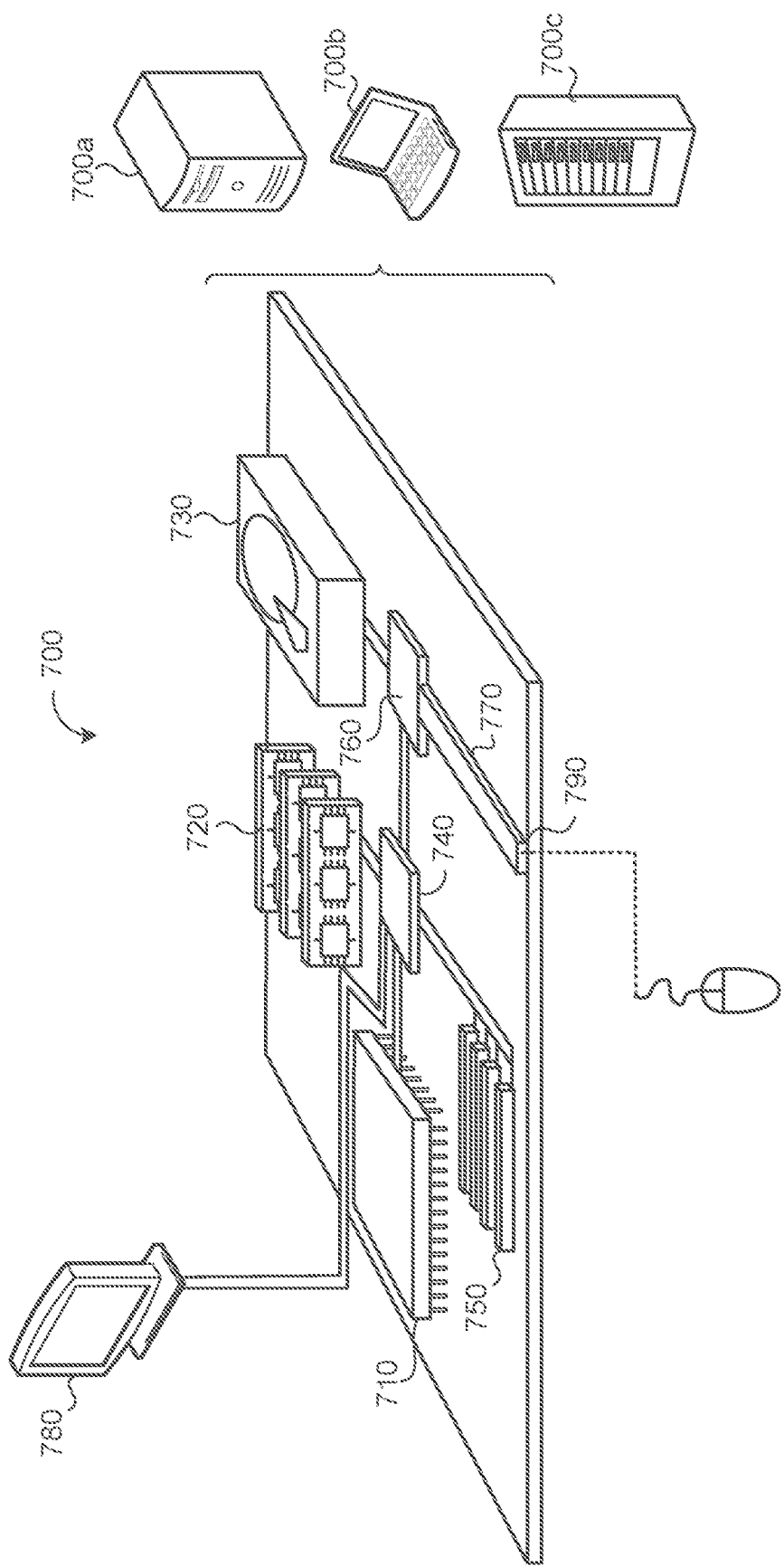
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 (e.g., data processing hardware 204, 144) can process instructions for execution within the computing device 700, including instructions stored in the memory 720 (e.g., memory hardware 206, 146) or on the storage device 730 (e.g., memory hardware 206, 146) to display graphical information for a graphical user interface (GUI) on an external input/output device, such as display 780 (e.g., screen 212 of FIGS. 2A and 2B) coupled to high speed interface 740. The processor 710 executes the ASR module 300 and the context server 400 in some implementations. In other implementations, multiple processors and/or multiple buses may be used, as appropriate, along with multiple memories and types of memory. Also, multiple computing devices 700 may be connected, with each device providing portions of the necessary operations (e.g. as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks, magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a user device, an automated speech recognition (ASR) request from a user of the user device, the ASR request comprising:
a speech input from the user, and
context metadata indicating that the speech input is associated with a voice-search application currently executing on the user device;
generating, by the data processing hardware, using a speech recognizer, a raw speech recognition result corresponding to the speech input;
based on the context metadata indicating that the speech input is associated with the voice-search application currently executing on the user device, normalizing, by the data processing hardware, the generated raw speech recognition result into text suitable for processing by a natural language understanding (NLU) module; and
processing, by the data processing hardware, using the NLU module, the text to understand the speech input.

2. The method of claim 1, wherein the speech input is captured by a microphone of the user device.

3. The method of claim 1, wherein the context metadata comprises an application identifier indicating that the voice-search application is currently executing on the user device.

4. The method of claim 1, wherein the context metadata comprises a speech recognition category indicating that the speech input is associated with a voice command for the user device to execute.

5. The method of claim 1, further comprising selecting, by the data processing hardware, a list of one or more denormalizers to apply to the generated raw speech recognition result based on the context metadata.

6. The method of claim 5, wherein selecting the list of the one or more denormalizers comprises modifying a default list of denormalizers from the predefined set of denormalizers by removing one or more denormalizers from the default list of denormalizers.

7. The method of claim 5, wherein selecting the list of the one or more denormalizers comprises modifying a default list of denormalizers from the predefined set of denormalizers by adding one or more denormalizers from a predefined set of denormalizers to the default list of denormalizers.

8. The method of claim 5, wherein selecting the list of the one or more denormalizers comprises:
retrieving each denormalizer of the selected list of the one or more denormalizers from memory hardware using a corresponding key, the memory hardware in communication with the data processing hardware; and
applying each denormalizer of the selected list of the one or more denormalizers retrieved from the memory hardware in sequence to the generated raw speech recognition result.

9. The method of claim 8, wherein the memory hardware resides on the user device.

10. The method of claim 1, wherein the speech recognizer and the NLU module execute on the data processing hardware of the user device.

11. A user device comprising:
data processing hardware; and
memory hardware in communication with the data processing hardware and storing instructions that when executed by the data processing hardware cause the data processing hardware to perform operations comprising:
receiving an automated speech recognition (ASR) request from a user of the user device, the ASR request comprising:
a speech input from the user; and
context metadata indicating that the speech input is associated with a voice-search application currently executing on the user device;
generating, using a speech recognizer, a raw speech recognition result corresponding to the speech input;
based on the context metadata indicating that the speech input is associated with the voice-search application currently executing on the user device, normalizing, the generated raw speech recognition result into text suitable for processing by a natural language understanding (NLU) module; and
processing, using the NLU module, the text to understand the speech input.

12. The user device of claim 11, wherein the speech input is captured by a microphone of the user device.

13. The user device of claim 11, wherein the context metadata comprises an application identifier indicating that the voice-search application is currently executing on the user device.

14. The user device of claim 11, wherein the context metadata comprises a speech recognition category indicating that the speech input is associated with a voice command for the user device to execute.

15. The user device of claim 11, wherein the operations further comprise selecting a list of one or more denormalizers to apply to the generated raw speech recognition result based on the context metadata.

16. The user device of claim 15, wherein selecting the list of the one or more denormalizers comprises modifying a default list of denormalizers from the predefined set of denormalizers by removing one or more denormalizers from the default list of denormalizers.

17. The user device of claim 15, wherein selecting the list of the one or more denormalizers comprises modifying a default list of denormalizers from the predefined set of denormalizers by adding one or more denormalizers from a predefined set of denormalizers to the default list of denormalizers.

18. The user device of claim 15, wherein selecting the list of the one or more denormalizers comprises:
   retrieving each denormalizer of the selected list of the one or more denormalizers from memory hardware using a corresponding key, the memory hardware in communication with the data processing hardware; and
   applying each denormalizer of the selected list of the one or more denormalizers retrieved from the memory hardware in sequence to the generated raw speech recognition result.

19. The user device of claim 11, wherein the speech recognizer executes on the data processing hardware of the user device.

20. The user device of claim 11, wherein the NLU module executes on the data processing hardware of the user device.

* * * * *